Jan. 23, 1945.  R. S. PALMER  2,368,038
MEANS FOR FORMING EXPLOSIVE MIXTURE AND BOMB FOR USE THEREWITH
Filed March 26, 1941   2 Sheets-Sheet 1
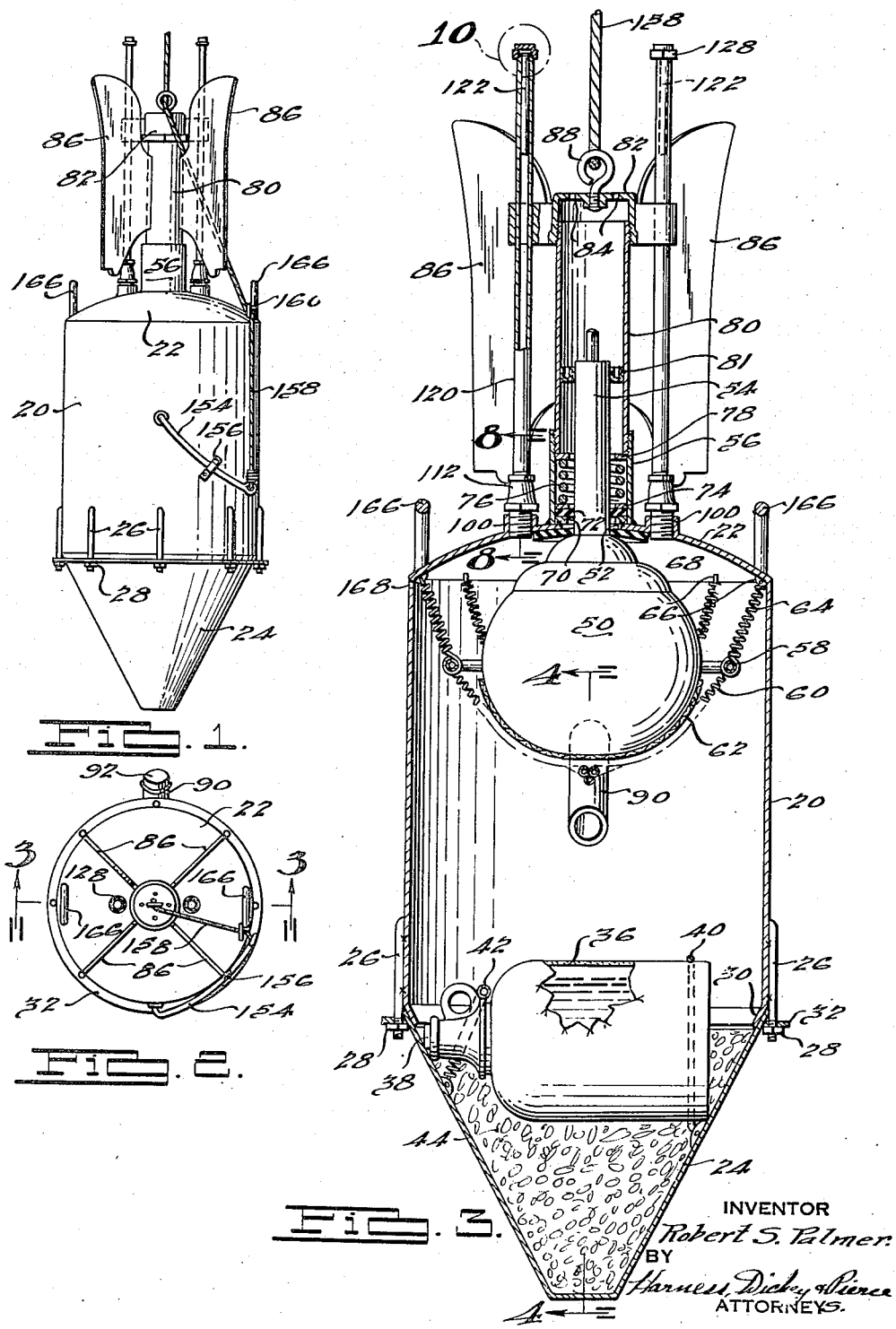
INVENTOR
Robert S. Palmer
BY
Harness, Dickey & Pierce
ATTORNEYS.

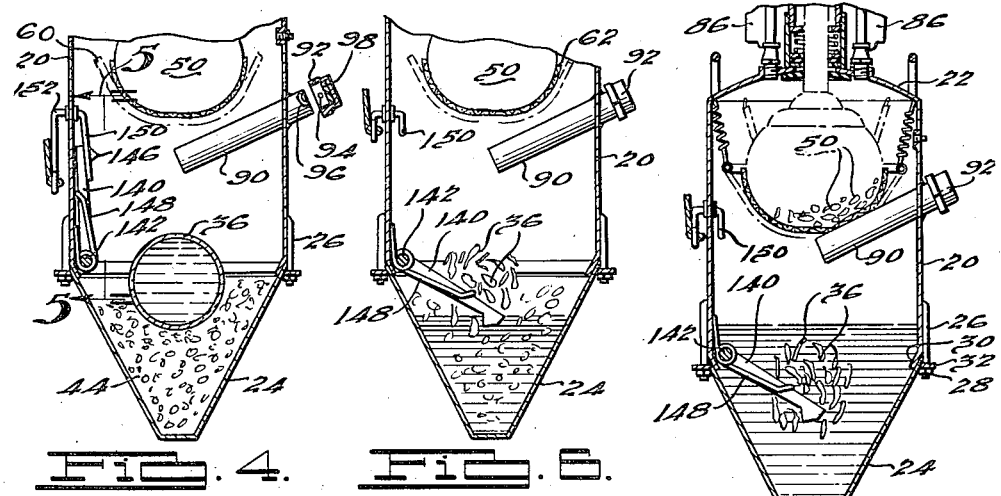

Patented Jan. 23, 1945

2,368,038

UNITED STATES PATENT OFFICE 2,368,038

MEANS FOR FORMING EXPLOSIVE MIXTURE AND BOMB FOR USE THEREWITH

Robert S. Palmer, Detroit, Mich.

Application March 26, 1941, Serial No. 385,318

6 Claims. (Cl. 102—57)

This invention relates to a method of utilizing a mixture of acetylene and oxygen for explosive effects and to the provision of a bomb in which this method is utilized.

Objects of the invention include the provision of a method of effecting a mixture of acetylene and oxygen for the purpose of utilizing the explosive effects thereof; the provision of a method of effecting a mixture of acetylene and oxygen in a relatively safe manner; the provision of a method of effecting a mixture of acetylene and oxygen wherein the two components may be handled with absolute ease and safety and comingling of the two components will not occur until immediately before the desired explosion thereof; the provision of a method as above described in which the acetylene is obtained by mixing calcium carbide and water but such mixture is not accomplished until immediately prior to the desired explosion resulting from the mixture of the acetylene with oxygen; the provision of a method as above described in which the oxygen is maintained in the form of liquid until immediately prior to the explosion thereof with the acetylene; the provision of a method as above described in which the water and the liquid oxygen are arranged in a suitable container in sealed relation with respect to each other, and the calcium carbide is not added until immediately prior to the time it is desired to condition the various components for utilizing their combined effect as an explosive; the provision of a method as above described in which the water and the liquid oxygen are contained in fragile containers; and the provision of a method as above described in which means are provided for first rupturing the water container and delivering the contents thereof on a bed of carbide and thereafter rupturing the container of the liquid oxygen and inter-mingling the same with the acetylene generated by the mixture of the carbide and the water.

Other objects of the invention include a method of utilizing the explosive effects of a mixture of acetylene and oxygen for explosive purposes comprising, first, generating a volume of acetylene by a mixture of carbide and water in a substantially closed container and thereafter introducing liquid oxygen into the acetylene thus formed in said chamber and effecting detonation of the mixture of acetylene and oxygen; the method of utilizing a mixture of acetylene and oxygen for explosive purposes comprising filling a substantially closed container with acetylene, then introducing a quantity of liquid oxygen into the container for mixture with the acetylene and then effecting detonation of the mixture; and the provision of a method of utilizing the explosive effects of a mixture of acetylene and oxygen for demolition or other purposes including generating acetylene in a substantially closed container and permitting air displaced by the generation of said acetylene to escape from said chamber, then introducing substantially pure oxygen into said chamber in the form of liquid oxygen, and then effecting combustion of the mixture of oxygen and acetylene.

Further objects of the invention include the provision of a bomb utilizing the explosive force of a mixture of acetylene and oxygen for its explosive effect; the provision of a bomb comprising a container providing means for generating acetylene therein and a supply of liquid oxygen, together with means for sealing the oxygen from the acetylene until immediately prior to the desired detonation of the bomb; the provision of a bomb of the type described including suitable quantities of water and liquid oxygen sealed with respect to each other until immediately prior to the desired detonation of the bomb; the provision of a bomb of the type described including a hollow container embodying a supply of water and a supply of liquid oxygen together with means for introducing a quantity of calcium carbide into the container in a quick and efficient manner, thereby enabling the conditioning of the bomb for an explosion to be put off until immediately prior to its desired use; the provision of a bomb of the type described in which means are provided for positively preventing inter-mingling of the oxygen escaping from the liquid oxygen container with the contents of the container until immediately prior to the desired detonation thereof; the provision of a bomb of the type described including a container having a supply of water therein sealed in a second and fragile container together with means for rupturing said fragile container at will; the provision of a bomb of the type described including a main container having a supply of oxygen therein contained in a second fragile container together with means for effecting rupture of said second container immediately prior to the desired detonation of the bomb; the provision of a bomb of the type described in which dual means are provided for insuring rupturing of the oxygen container; the provision of a bomb of the type described including means for enhancing the mixture of the liquid oxygen from the oxygen container with the acetylene within the main container; the provision of a bomb of the type described in which means are provided for igniting the mixture of oxygen and acetylene in the container upon impact with a body; the provision of a bomb of the type described in which the ignition means also serves to effect a mixing of the oxygen and the acetylene in the container; the provision of a bomb of the type described including means for effecting rupture of the oxygen container upon impact with the ground or other body but in advance of the ignition of the mixture; and the provision of a bomb of the type described including certain novel details of construction contributing to the safety in handling and efficiency in operation of a bomb, of the type described.

The above being among the objects of the present invention the same consists in certain novel steps of procedure and/or operation, and certain novel features of construction, to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a side elevational view of an illustrative embodiment of a bomb constructed in accordance with the present invention;

Fig. 2 is an end view of the bomb shown in Fig. 1 looking downwardly thereon;

Fig. 3 is an enlarged, vertical sectional view taken centrally through the bomb shown in the preceding figures, as on the line 3—3 of Fig. 2;

Fig. 4 is a reduced, fragmentary vertical sectional view taken on the line 4—4 of Fig. 3 illustrating the same in the condition it will assume immediately prior to its being dropped from an airplane or otherwise prepared for a substantially immediate use;

Fig. 5 is a fragmentary, sectional view taken on the line 5—5 of Fig. 4 and illustrating the hammer element for fracturing the water container and the releasable catch for holding it in cocked position;

Fig. 6 is a view similar to Fig. 4 but illustrating the position of the hammer after it has broken the water container but prior to the fracture of the oxygen container;

Fig. 7 is a view similar to Fig. 6 but illustrating certain relation of the parts as will occur upon impact of the bomb with the ground or other object and illustrating the manner of fracturing the oxygen container;

Fig. 8 is an enlarged fragmentary, vertical sectional view taken on the line 8—8 of Fig. 3 and illustrating in greater detail the construction of the detonating mechanism;

Fig. 9 is a transverse sectional view taken on the line 9—9 of Fig. 8;

Fig. 10 is an enlarged fragmentary, sectional view taken centrally through the upper end of the detonation tube within the area 10 indicated in Fig. 3 to better illustrate the construction of the same;

Fig. 11 is a fragmentary view similar to a portion of Fig. 3 but on a reduced scale, illustrating an alternative method of effecting fracture of the oxygen container;

Fig. 12 is an enlarged fragmentary, side elevational view taken on the line 12—12 of Fig. 11 and illustrating a valve mechanism for controlling the escape of air from the bomb and for limiting the pressure of the acetylene gas generated therein; and, Fig. 13 is an enlarged fragmentary, sectional view taken on the line 13—13 of Fig. 12 and illustrating the details of construction of the valve shown in Fig. 12.

It is well understood that a mixture of acetylene and oxygen when burned as a mixture in a cutting torch or the like produces a flame the temperature of which is the highest that has been capable of being attained by human beings excepting only an electric arc. The temperature attained by combustion of these elements is, of course, indicative of the speed of the chemical reaction between them during combustion. Mixtures of acetylene and oxygen are highly explosive and the burning action of a mixture of these two gases upon combustion is so rapid, particularly where confined, that it is impossible to employ it as a propellant for projectiles or the like. However, this very characteristic of the mixture makes it particularly desirable for use as a demolition agent and as, for instance, the explosive agent in demolition bombs employed in warfare. The use of such mixture for such purposes constitutes the principal object of the present invention.

A mixture of acetylene gas and oxygen is extremely dangerous to handle, it being relatively unstable and liable to explode upon concussion. In order to enable its explosive effects to be safely utilized it is, therefore, necessary to limit the inter-mingling of the acetylene and oxygen to a time period immediately prior to the desired explosion thereof and it is the method and means for accomplishing this result that the present invention primarily deals with.

In accordance with the present invention a container is provided for holding a mixture of acetylene gas and oxygen and in which the mixture is ignited. The container itself may be of relatively light material inasmuch as it is not the fragments of the container propelled under the effects of the explosion therein that is depended upon for the destructive effects of the bomb, but rather the powerful blast of the mixture and the effect of this blast upon the adjacent objects that constitutes the desired end. All that is required of the container is that it be sufficiently sturdy to prevent substantial rupture thereof solely by reason of its contact with the ground when dropped from an airplane or the like. It may, therefore, be made of relatively inexpensive material and constructed in a relatively inexpensive manner.

The acetylene gas is obtained by generating it within the container by a mixture of calcium carbide and water. The water is introduced in a closed container of fragile characteristics capable of being ruptured in a quick and easy manner, and while this may be accomplished in various ways in accordance with the broad aspects of the invention a cheap and effective means for accomplishing this result comprises placing the water in a glass container. Any suitable concussion means may be provided for fracturing this container at the desired moment but where the container is of glass, a releasable spring urged hammer provides a simple and effective means for fracturing the water container.

The water thus being sealed in a container, the calcium carbide with which it is to be mixed in order to generate the acetylene gas may be introduced into the container at the time of manufacture and/or assembly or be introduced immediately or shortly before the bomb is conditioned for use, the latter feature being preferable inasmuch as it positively eliminates any possibility of an explosive mixture being created in the container through inadvertent breakage of the water container or leakage of water therefrom, through inadvertent mishandling or the like, until immediately before it is intended to use the bomb. This serves as a safety measure positively eliminating any possibility of premature explosion during the manufacture, transporting and/or storage of the bomb.

The oxygen required for admixture with the acetylene gas in order to create the desired explosive mixture is provided in the form of liquid oxygen carried in a fragile container also positioned within the main container. Inasmuch as it is impossible to tightly close a container of liquid oxygen, means are provided for permitting the escape of oxygen evaporating from the oxygen container to the exterior of the main container without possibility of inter-mingling with the contents of the main container. Liquid oxygen is employed for the reason that it may be obtained in substantially pure form and when vaporized occurs in gaseous form at substantially 800 times its volume in liquid form. It, therefore, provides an ideal means of providing the required quantity of oxygen for mixture with the acetylene gas generated in the container to obtain the desired explosive mixture. The oxygen is preferably not mixed with the acetylene gas until a sufficient time period has elapsed between the initiation of the generation of the acetylene gas by the breaking of the water container to permit the acetylene gas being generated to displace substantially all the air from the container and fill the interior of the container with substantially pure acetylene.

The breakage of the liquid oxygen container subsequent to the breaking of the water container may, of course, be effected in a number of different ways depending upon the use to which the bomb is to be put. Where the bomb is to be dropped from an airplane the concussion of the bomb with the earth or other objects may be depended upon for fracturing the oxygen container, that is by employing the inertia built up in the oxygen container due to its fall towards the earth such inertia acting through the support for the oxygen container or against some fixed object in the main container may be employed for fracturing the oxygen. On the other hand, some inertia operated element energized during the fall of the bomb toward the earth and actuated upon contact of the bomb with the earth may be employed to break the oxygen container. The pressure of the air acting on the bomb during its fall towards the earth may be employed to actuate or release suitable means for fracturing the oxygen container, or the pressure built up within the container by the generation of acetylene therein may be employed for fracturing the oxygen container or releasing fracturing means therefor, or suitable time operated or controlled mechanism may be employed to effect this result. Where the bomb is to be employed as a depth bomb then it necessarily will require a construction imparting sufficient weight thereto to insure sinking in the water and in such case the oxygen container may be fractured and the bomb ignited either by a pressure operated or controlled mechanism or by suitable time controlled or actuated mechanism. Where it is to be simply placed by hand in a building or the like in order to demolish the same, then suitable time control mechanism may be employed for fracturing the oxygen container and igniting the bomb. Furthermore, when employed as a depth bomb no separate water container will be necessary as the required amount of water may be permitted to flow in from the outside.

In any event it will be appreciated that in accordance with the practice of the method of the present invention a substantially closed container is provided in which a quantity of water and a quantity of liquid oxygen, each in a separate fragile container, are placed, a suitable amount of calcium carbide is introduced in the container in a position to be contacted by the water upon rupture of the water container, and means operable at will are provided for rupturing the water container at the desired moment. Rupture of the liquid oxygen container is thereafter effected to produce a mixture of the oxygen with the acetylene thus generated by the comingling of the water and calcium carbide and where concussion alone is not relied upon to effect initiation of the combustion of the acetylene and oxygen means preferably arranged in delayed relation with respect to the breaking of the oxygen container is provided for igniting the mixture.

It will be appreciated that the actual apparatus provided for carrying out the above described method may assume a great variety of different forms and constructions, that shown in the drawings being simply illustrative of one form of construction that appears to be suitable for the purposes of the present invention, the particular form shown being an embodiment of that type of bomb adapted to be dropped from aircraft. A description of the construction, method of use and operation of the construction shown in the drawings will, however, disclose the essential features of the method of the present invention and an apparatus by means of which such method may be carried out.

Referring now to the drawings and particularly to Figs. 1, 2 and 3 it will be noted that the device there shown consists of a main container forming a casing or housing and including a cylindrical main body portion 20 formed from a suitable grade and thickness of sheet metal having a convex top wall 22 secured in gas-tight relation with respect thereto as by welding or the like, and a conically shaped bottom end, nose, or point 24 removably secured to the main body portion by means of studs 26 and nuts 28, the studs 26 being preferably secured to the main body 22 in equally angularly spaced relation about the periphery thereof. It is preferable that the point 24 be secured to the main body portion 20 in substantially fluid-tight relation and for the purpose of effecting this result the lower marginal end of the main body portion 20 is inwardly turned as at 30 to an extent commensurate with the angularity of the point 24 and is received within the upper margin of the bottom or point 24. An outwardly directed annular flange 32 surrounds the upper end of the point 24 and is preferably fixed thereto as by welding and this flange 32 is provided with suitable holes therein for passage of the studs 26, the nuts 28 being applied to the studs below the flange 32 and upon being threaded upwardly thereon draw the cooperating tapered surfaces of the nose and main body portion together. The flange 32 also materially reinforces the nose 24 against rupture on initial contact with the ground under the spreading force of the main body 20.

The nose 24 serves as the acetylene generating portion of the device and is, therefore, preferably fluid-tight and adapted to contain the calcium carbide and water by means of which the acetylene is generated. The water as previously mentioned is sealed in a fragile container and while this container may take any suitable form it is shown in the drawings as comprising simply a glass bottle 36 substantially filled with water sealed therein by means of a cork or stopper 38, care being taken to leave a sufficient amount of air in the bottle to take care of any usual expansion or contraction of the bottle or its contents due to variation in temperature thereof.

Means are provided for holding the bottle 36 in a predetermined position in the nose 24 and while any suitable means may be provided for this purpose that shown consists of a metal ring 40 welded or otherwise suitably secured to the inner face of the nose 24 and of a size and in a position to receive the base portion of the bottle therein as shown. A garter spring 42 also suitably secured to the inner face of the nose 24 is positioned to receive the neck end of the bottle and to locate it and hold it in predetermined position. When the device is conditioned for operation a suitable amount of calcium carbide 44 is poured into the nose 24 and falls by gravity to a position below, and where introduced in sufficient volume, around the bottle 36 as indicated in Figs. 3, 4 and 6. The water in the bottle 36 and the calcium carbide 44 thus provide the means necessary to generate the acetylene required in an explosion of the device.

The oxygen which is required for mixture with the acetylene to complete the desired explosive mixture is as previously explained also contained within a fragile container positioned within the main container, the oxygen container being preferably in the form of a Dewar flask 50 which is the preferable form of container for the reason that it includes double walls the space between which is under vacuum and which, therefore, minimizes the transfer of the heat through the bottle to the liquid oxygen therein to minimize the loss of oxygen from the bottle due to vaporization. The top wall 22 of the main container is provided with a central opening 52 therein through which the neck 54 of the flask 50 projects as indicated in Fig. 3. A sleeve 56 positioned with its axis aligned with the axis of the main body portion 20 and with the opening 52 is welded or otherwise suitably secured to the upper face of the cover 22 in surrounding relation with respect to the neck 54 of the flask 50 and is outwardly spaced from such neck.

In order to support the flask 50 for downward movement upon impact of the bomb with the ground or other like object after being dropped from an airplane or the like in order to utilize the particular method of fracturing the flask 50 employed in the construction shown, the flask is supported in the following manner. A substantially rigid ring 58 surrounds the flask 50 adjacent its greatest diameter. A plurality of relatively small coil springs 60 are extended between angularly separated and preferably diametrically opposed points on the ring 58 so as to provide a plurality of resilient and criss-cross elements for engagement with the bottom of the flask 50 to thereby provide a support for the same. The spring elements 60 being yieldable and resilient readily conform to the shape of the bottom of the flask 50 and distributes the pressure therefrom evenly over the bottom of the flask so as to eliminate any possibility of premature fracture of the flask through the application of localized pressure in the supporting means. It may also be preferable, under some circumstances at least, to interpose a sheet of wire screen or netting 62 between the springs 60 and the bottom of the flask 50 not only to aid in the support of the flask but also to aid in breaking up the flow of liquid oxygen from the flask after it has been broken and to distribute it in finely divided condition into the body of acetylene which at that time will fill the interior of the main container. The ring 58 is supported by means of a plurality of coil springs 64 stretched between it and suitable brackets such as 66 secured to the inner surface of the container adjacent the junction of the main body portion 20 and top 22 thereof as indicated in Fig. 3.

Those skilled in the art will understand that it is substantially impossible to completely seal liquid oxygen in a container and this is particularly true where the container is of fragile characteristics as in the particular case of the flask 50 shown. Where liquid oxygen is stored in a vacuum insulated flask of the character of a Dewar flask approximately 2% of its volume will evaporate per day at ordinary temperatures. It is, therefore, necessary to permit the escape of the vaporized oxygen from the flask 50 prior to shattering the same and it is also important to prevent such vaporized oxygen as escapes from the flask 50 from comingling with the gases contained within the main container particularly if acetylene gas is present in the main container. To accomplish this result in the present instance a ring 68 of soft rubber or other resilient material impervious to the passage of gas therethrough is placed over the neck 54 of the flask 50 before the flask 50 is inserted into the position shown, the ring 68 preferably snugly fitting the neck 54 and bearing against the main body portion of the flask 50 immediately below the neck. The springs 60 and 64 are so arranged that they resiliently urge the flask 50 upwardly and, therefore, act to compress the ring 68 between the main body portion of the flask 50 and the lower face of the cover member 22 surrounding the opening 52 to enhance the sealing effects of the ring 68.

The sealing effect of the neck 54 of the flask 50 is further enhanced in the following manner. It will be observed from an inspection of Fig. 3 that the inner diameter of the sleeve 56 is greater than the diameter of the opening 52 and the neck 54 is freely received in the opening 52. A rigid ring 70 is preferably welded into place in the bottom of the sleeve 52 to the upper surface of the top 22 exposed therein. The central opening in the ring 70 is sufficiently large to provide ample clearance between the ring 70 and the neck 54 of the flask 50. The ring 70 is followed by a ring 72 of soft rubber or other suitable yieldable and gas impervious material and not only snugly fits the neck of the bottle 54 but also snugly fits the inner surface of the sleeve 56. The ring 72 is in turn followed by another ring 74 which may be identical to the ring 70 and this is followed by a coil spring 76 in turn followed by a ring 78 which may be identical to the rings 70 and 74. The ring 78 is maintained axially in position in the sleeve 56 by contact with the lower end of a tube 80 threaded downwardly into the upper end of the sleeve 56. The spring 76 is maintained under compression between the washers 74 and 78 and in pressing the washer 74 downwardly acts against the resilient washer 72 to radially expand the same into contact with the inner walls of the sleeve 56 and contract the same about the neck 54 to enhance the sealing effect thereof. Preferably a U-sectioned leather ring 81 is interposed between the upper end of the neck 54 of the flask 50 and the inner walls of the tube 80 to provide a further seal. The ring 81 is preferably of such characteristics as to resiliently grip the neck 54 and press against the inner walls of the tube 80 but of sufficient resiliency to permit a small amount of movement of the neck if necessary.

From the above it will be appreciated that a triple seal is thus provided to prevent the possibility of oxygen evaporating or spilling from the neck of the flask from seeping down into the interior of the main container. These seals form two gas and liquid-tight chambers, namely one between the rings 68 and 72 and one between the rings 72 and 81. Oxygen in evaporating from a flask such as that shown, because of its low temperature tends to flow downwardly. Where the rings 68 and 72 are made of rubber, should the oxygen contact them the resiliency of these sealing rings might be destroyed. Such oxygen in the construction shown will be caught and retarded primarily by the ring 81 which, being of leather and not material affected by low temperatures, will be continuously effective and thus maintain the effectiveness of the remaining seals. However, once the seals are effective at normal temperatures their sealing properties will not be greatly affected by temperature. The seals should have enough resiliency to permit a slight amount of movement of the flask 50 and its neck 54 at normal temperatures.

Thus any of the liquid oxygen in the flask 50 which evaporates and escapes therefrom is effectively prevented from finding its way down into the main container but instead is discharged into the interior of the tube 80. The tube 80 is provided with a cap 82 threaded thereon which in turn is provided with a plurality of small vent openings 84 through which the evaporated oxygen may escape from the interior of the tube 80 to the atmosphere.

The tube 80 has fixed thereto a plurality, shown by way of illustration as four, of radially outwardly directed metallic fins 86 arranged in equally angularly spaced relation around the circumference of the tube 80. These fins are for the usual purpose of maintaining the axis of the bomb parallel with the path of movement when dropped from a plane. The cap 82 is centrally provided with a screw eye 88 as indicated in Figs. 1, 2 and 3 for a purpose which will hereinafter be described.

As indicated best in Figs. 3, 4, 6 and 7 a tube 90 is projected through the side of the main body portion 20 and is securely welded in place thereto. The tube 90 is disposed with its axis at an angle to the horizontal and with its inner end lower than its outer end and is so positioned that when the flask 50 is in its normal position illustrated in Fig. 3 the tube 90 extends below and in slightly spaced relation to the under-surface of the flask 50, such space preferably being in the neighborhood of one-half to one inch but operable when spaced either a greater or lesser amount.

As best illustrated in Figs. 4, 6 and 7 that portion of the tube 90 which projects outwardly beyond the outer surface of the main body portion 20 is provided with a cap 92 arranged to be removably secured over the end of the tube 90 and in sealing relation with respect thereto. Preferably the type of connection between the cap 92 and the tube 90 is such to permit the cap 92 to be quickly applied to the tube 90 and locked in position thereon. The particular form of connection shown comprises a pair of inwardly projecting pins 94 in the cap 92 cooperable with corresponding bayonet slots 96 in the outer end of the tube 90, the cap 92 being preferably internally provided with a resilient gasket 98 to enhance the sealing effect of the connection.

On diametrically opposite sides of the collar 56 the top wall 22 of the main container is provided with a pair of upwardly opening threaded bosses 100. As best illustrated in Fig. 8 each of the bosses 100 threadably receives a plug member 102 having a central bore 104 the upper end of which bore is chambered to receive a conventional gun cartridge 106. The cartridge 106 has the usual lead projectile 108 and a centrally disposed primer cap 110. A threaded reducer type of coupling 112 is threaded upon the upper end of the plug 102 and internally thereof above the plug 102 threadably receives a centrally apertured plug member 114. Confined between the upper end of the plug 114 and the reduced bore of the coupling member 112 is a curved leaf type of spring 116 having centrally secured thereto a firing pin 118 which projects downwardly through the bore of the plug 114 in aligned and normally spaced relation with respect to the primer cap 110 of the cartridge 106. Threaded into the reduced upper end of each reducer 112 is the lower end of an upwardly extending tube 120. The tubes 120 are of a material length as illustrated in Figs. 1 and 3, preferably extending upwardly beyond the upper ends of the fins 86 as illustrated. Within each of the tubes 120 is slidably received a cylindrical metallic inertia member 122.

As best illustrated in Fig. 10 the upper end of each tube 120 is diametrically slotted as at 124 and the upper end of each inertia member 122 is provided with a wire or pin 126 projecting diametrically therethrough and projecting a short distance therebeyond at each end, the ends of the pins 26 being received in the slot 24 of the corresponding tube 120 as illustrated in Fig. 10. A cap 128 closes the upper end of each tube 120. It will be observed that the ends of the pins 126 in resting against the bottoms of the corresponding slots 124 normally serve to hold the corresponding inertia members 122 at the upper ends of the tubes 120. One or more openings such as 130 in the caps 128 as illustrated in Fig. 10 and one or more openings 132 in the reducers 112 as illustrated in Fig. 8 may be provided for the admission and escape of air to and from the tubes 120 during projection of the inertia members 122 downwardly therein if deemed necessary or desirable.

It will be appreciated that the application of the bottle 36 and flask 50 to the device is required to be performed while the nose or bottom 24 is removed from the main body portion 20, the former being accomplished by slipping the base of the bottle into the ring 40 and then stretching the spring 42 over the neck thereof. The insertion of the flask 50 is accomplished by unhooking a portion of the springs 64 from their brackets 66, inserting the flask 50 into place and then rehooking the springs 64 thereby to resiliently press the flask 50 upwardly as previously described. The flask 50 is preferably inserted empty and filled at a later stage of operation as will hereafter be more fully explained.

The calcium carbide 44 may be introduced into the nose or bottom 24 while it is separated from the main body portion 20 and preferably after the bottle 36 is in place, or it may be introduced after assembly of the nose 24 to the main body portion 20 by introducing the calcium carbide through a suitable opening in the main body portion provided therefor. From a standpoint of safety it is preferable not to introduce the calcium carbide 44 until shortly before it is desired to use the bomb as it will be appreciated that in the absence of the calcium carbide 44 in the device the breakage of the bottle 36, the flask 50 or both of them would not create any dangerous condition. The breaker bar 90 for the flask 50 when made tubular as illustrated and of a sufficient diameter and provided with a readily removable and replaceable cap, such as the cap 92, offers a means whereby the calcium carbide may be introduced through it in a quick and efficient manner and thereafter be sealed against the escape of gas therethrough. The tube 90 in the construction shown thus serves two separate functions.

As previously mentioned any suitable and manually controllable means operable at will by the person or apparatus dropping the bomb may be provided for breaking the glass container 36 for the water. The means shown in the drawings by way of illustration and as best brought out in Figs. 4 to 7, inclusive, comprises a hammer element 140 pivotally mounted within the main body portion 20 about a pin or shaft 142 extending between a pair of brackets 144 fixed to the inner side of the main body portion 20 adjacent the lower edge thereof. The element 140 preferably but not necessarily has a pointed striking surface 146 adapted for actual contact with the bottle or container 36. A conventional form of torsion spring 148 cooperates between the hammer element 140 and the inner wall of the container 20 normally tending to rotate the hammer element 140 in a clockwise direction of rotation as viewed in Figs. 4, 6 and 7. The hammer element 140 is normally maintained in its upper inoperative position by means of a catch element 150, the construction of which is best brought out in Fig. 5, which is secured to a short shaft portion or member 152 which rotatably projects through the side of the main body portion 20 as illustrated in Figs. 4, 6 and 7 and exteriorly of the main body portion 20 is provided with an arm 154 fixed thereto. During storage and ordinary transportation a suitable and readily releasable clip 156 secured to an exterior face of the main body portion 20 overlies the arm 154 and locks it against inadvertent movement. A suitable cord 158 has one end thereof secured to the outer end of the arm 154 as indicated in Fig. 1 and then passes through an eye 160 fixed to the top 22 from which it extends through the eye 88 previously mentioned. It will be appreciated that upon removal of the safety catch 156 and pulling on the free end of the cord 158, the arm 154 will be caused to rotate in a counter-clockwise direction as viewed in Fig. 1 thereby moving the catch 150 from the position illustrated in full lines in Fig. 5 to the position illustrated in dotted lines and thus will free the hammer element 140 to move under the force of the spring 148, whereupon the pointed surface 146 thereof will swing on an arc into contact with the bottle 36 and as illustrated in Fig. 6, in striking the bottle 36, it will shatter it and discharge the contents thereof into the point or bottom 24. The spring 148 is preferably of sufficient strength to cause the pointed end 146 of the hammer element 140 to pass completely through both sides of the bottle or container 36 thus to insure the entire contents thereof being quickly and positively discharged.

The flask 50 being resiliently supported in position within the main container of the device, it will be appreciated that if the device is dropped from an airplane, for instance, upon striking the ground or other object the inertia of the flask 50 and its contents will cause the springs 60 and 64 to yield and the flask 50 will move downwardly and strike the breaker bar or tube 90, the force of the blow being sufficient to completely shatter the flask 50 and discharge the contents thereof downwardly into the container. The criss-cross spring 60, and the wire screen 62 where employed under such conditions, will cause the liquid oxygen in the flask 50 to cascade downwardly in a plurality of fine particles or streams through the gases in the main container and over the contents in the bottom of the container.

It will also be appreciated that when the device strikes the ground under the circumstances above assumed, the inertia elements 122 in the tubes 120 will, because of the inertia created in them due to their downward movement shear the pins 126 and will thus be projected downwardly in their tubes 120. The pins 126 are formed of such material and so proportioned that while capable of maintaining the position of their inertia elements 122 even under the severest conditions in handling, when the device is subjected to a shock such as occurs when the bomb is dropped from an airplane or the like and strikes the ground, the pins 126 will readily shear to permit the continued downward movement of the inertia members 122. As the inertia members 122 move downwardly under such conditions when they reach the bottom of their corresponding tube 120 they will strike the corresponding spring 116 and drive the corresponding firing pin 118 thereof downwardly into contact with the percussion cap 110 and cause the corresponding cartridge 106 to be exploded, the bullet 108 thereof passing downwardly through the bore 104 and through any portion of the flask 50 remaining under such conditions, the force of the explosion of the cartridges 106 aiding in mixing the liquid oxygen from the flask 50 with the remaining contents of the main container and igniting such contents if not already ignited by the shock.

It might be desirable before describing the actual sequence of operations followed in use of the bomb to note that the main container is preferably provided with a pair of handles 166 attached thereto for facilitating manual handling of the bomb and that as indicated in Fig. 3 a small opening 168 is provided in the main container adjacent the upper end thereof for the escape of air from the main container during the generation of acetylene therein and to permit the escape of sufficient acetylene from the container to avoid building up excessive pressures in the container prior to the time of the actual explosion.

In the use of the bomb structure thus described it will be appreciated that ordinarily the main body portion 20 and parts carried thereby will be disassembled from the nose portion 24, and the water containers 36, oxygen containers 50, the calcium carbide 44 and the cartridges 106 will be stored separately from one another. When it is desired to employ the bomb for destructive purposes, shortly before the airplane which is to drop the bomb is ready to take off, the reducers 112 and tubes 120 are removed.

The flask 50 is preferably but not necessarily filled with oxygen until after they have been mounted in place in the bomb. This is for the reason that if filled before insertion into place they are liable to be very cold, or the oxygen evaporating from them very cold, to such an extent as to possibly impair the desired sealing characteristics of the rings 68 and 72. In either event the tube 80 is also removed and its cap 82 is removed from it. The flask 50 is then inserted in place and if not already filled with liquid oxygen such filling is now accomplished in a conventional manner. In either case, that is where the flask has been filled before or after insertion, the tube 80 is then re-applied and the sealing ring 81 is inserted into place. The cap 82 is then applied. This having been done, the cartridges 106 are inserted in place and the reducers and tubes 129 are applied in place. The hammer element 140 is then cocked and retained by the catch member 150 and the safety catch 156 is then applied to the arm 154 exteriorly of the main body portion 20.

The water container or bottle 36 filled with a suitable volume of water is then positioned in the nose portion 24 and secured in place as previously described. If the calcium carbide is to be inserted at this stage of operation, it is then poured into the nose 24 and around the water container 36 and the nose portion 24 is then secured to the main body portion 20 by means of the studs 26 and nuts 28. If the calcium carbide 44 is not to be introduced until a later time, as is preferable as a safety measure, then the nose 24 is secured to the main body portion 20 without the introduction of the calcium carbide therein. The device at this stage of operation is then fully conditioned except in such cases where the calcium carbide has not yet been introduced and will hereinafter be assumed for the purposes of description.

Assuming now that the bomb has been conditioned as above described except for the introduction of the calcium carbide thereinto, it is placed aboard the plane which is to drop it and which plane also carries for each bomb a suitable container carrying a sufficient amount of calcium carbide for a single such bomb, such container being of a type which will permit it to be applied to the outer end of the tube 90 when the cap 92 is removed therefrom and the contents discharged into the interior of the bomb in a quick and efficient manner. The calcium carbide employed for this purpose is preferably in relatively small pieces, as for instance the size of a pea or the like which not only facilitates its introduction through the tube 90 into the interior of the bomb but also is of such size as to permit substantially all of it to be immediately acted upon by the water when discharged over it and thereby generate acetylene gas at a maximum rate. The introduction of the calcium carbide into the bomb before it is placed aboard a plane which is to drop the bomb may involve danger if the plane should crash for any reason whatever before reaching its objective, or if a bullet from an enemy plane should penetrate the carrying plane and the bomb and break the water container before an opportunity is had to drop the bomb. For this reason it is preferred not to introduce the calcium carbide into the bomb until a few minutes before the objective is reached and this is entirely possible because of the rapidity with which a number of such bombs may be charged one after the other with the calcium carbide as above described. In any event the bomb at the time it is ready to be dropped will be in the condition shown in Figs. 3 and 4, except as to Fig. 4 the cap 92 will be firmly secured in place.

The bomb may, of course, be dropped by hand by opening a trap door in the floor of the plane and dropping it therethrough, or it may be mounted in suitable or conventional bomb racks and released in a suitable or conventional manner. In either case, a moment before the bomb is dropped the catch 156 is released and in any event some means are provided for retarding the escape of the free end of the cord 158 from the carrying plane, or during its passage through the air, so as to release the catch 150 from the hammer element 148 shortly after the bomb is discharged from the carrying plane. This may be accomplished by an operator grasping the free end of the cord 158 and not releasing it until a sufficient pull has been exerted on the cord through the descent of the bomb to insure release of the catch 150. On the other hand a small parachute may be attached to the free end of the cord 158 to effect the same results. Where the cord 158 is made of a material and of a size capable of being readily broken when the inertia of the falling bomb is applied to it, then its free end may be tied or otherwise secured to some portion of the plane so that when the effective length of the cord 158 has been paid out it will automatically trip the catch 150 and release the hammer element 140 and then break. In any event for the purpose of extreme care the length of the cord 158 is such, or the method of applying or retarding action upon it to release the catch 150 is such, that the catch 150 will not be released until the bomb has dropped a distance below the carrying plane sufficient to obviate any damage to the plane should the bomb inadvertently burst upon release of the hammer element 140. It will, of course, be appreciated that unless the oxygen flask 50 has been inadvertently broken so as to discharge oxygen therefrom into the interior of the bomb there is no possible chance of inadvertent explosion of the bomb upon breaking of the water container 36. From this it will be understood and it is entirely possible without an undue amount of danger, to trip the lever 154 and catch 150 manually before the bomb is dropped from the carrying plane, and the present invention contemplates such procedure if desired or necessary, but from a standpoint of exercising a maximum amount of care, the procedure first described is preferable.

The moment the water container 36 is broken as above described the water therefrom will flood the calcium carbide 44 in the nose 24 in a manner somewhat as illustrated in Fig. 6 and immediately the chemical reaction between the water and the calcium carbide will begin to generate acetylene gas. The relative amounts of water and calcium carbide preferably employed is such that an excessive amount of acetylene is capable of being generated, the reaction between the calcium carbide and the water forming a foamy mass which will well up in the lower portion of the bomb somewhat in the manner illustrated in Fig. 7. The rapid generation of acetylene gas will drive the air within the bomb out through the opening 168 illustrated in Fig. 3 in an exceedingly short period of time and thereafter excessive amounts of the acetylene gas which is generated may escape through the opening 168, it being of a sufficient size, determined by experimentation or otherwise, to prevent an excessive or harmful amount of pressure from being built up within the bomb prior to its contact with the ground or other object.

When the bomb strikes the earth as illustrated in Fig. 7 two separate things occur. The first is that the inertia of the flask 50 and its content of liquid oxygen will cause the flask and its contents to continue to move downwardly against the force of the springs 60 and 64, a slight movement in this direction bringing the flask into contact with the tube 90 which will cause it to be instantaneously fractured and cause the contents thereof to be cascaded down into the interior of the bomb and mixed with the acetylene gas therein. As previously mentioned the provision of the wire screen 52 will aid in the fine dispersion of this liquid oxygen through the body of acetylene, thus aiding in forming an intimate mixture of the oxygen and acetylene. The heat generated by the chemical reaction between the calcium carbide and water will aid in the vaporization of the liquid oxygen.

Additionally, when the bomb strikes the ground or other object the inertia of the inertia members 122 is sufficient to shear their pins 126 upon which the inertia members 122 are driven downwardly in their respective tubes 120 to effect firing of their corresponding cartridges 106, the bullets 108 in passing downwardy shattering any remnants of the flask 50 that may remain, the force of the explosion aiding the mixing of the oxygen and acetylene, and the fire from the cartridges 106 ignite the explosive mixture thus created in the interior of the bomb, if such mixture has not already been ignited due to impact with the ground, with the resultant explosion of the bomb. It will be noted that because of the relatively greater distance that the inertia members 122 must travel in order to fire the cartridges 106 as compared to the distance which the flask 50 must travel to be broken upon the tube 90, an appreciable time element, even though relatively short, is provided for accomplishing the admixture of the liquid oxygen with the acetylene gas and the vaporization of a sufficient amount thereof to provide the desired explosive mixture, before explosion of the cartridge 106 positively ignites the explosive mixture. In this respect the size of the pins 126 and the material from which they are formed may be such as to materially retard the speed of passage of the inertia members 122 downwardly in their respective tubes 20 as an aid in increasing such time element. Obviously such time element may also be increased by increasing the length of the tubes 120.

In any event the moment that the bomb hits the ground or other object the contents of the flask 50 will be cascaded almost instantaneously throughout substantially the entire interior volume of the bomb with the result that a substantially perfect explosive mixture capable of unusual destructive effects is provided. Upon ignition of this explosive charge the walls of the bomb will, of course, be shattered so that the effects of the explosion will be effective in all directions.

It may be advisable under some conditions to effect an admixture of the liquid oxygen in the flask 50 with the acetylene content of the bomb in advance of the time the bomb strikes the ground or other object and in Figs. 11, 12 and 13 a modified form of apparatus for rupturing the oxygen container is shown by way of illustration of one means by which this result may be accomplished.

In the construction illustrated in Figs. 11, 12 and 13 the tube 90 will still be retained and located substantially in the position illustrated in the previous views not only for the purpose of permitting the introduction of the calcium carbide as previously described but also as a safety means for insuring breakage of the flask 50 when the bomb hits the ground. However, in this modification the means primarily provided for fracturing the oxygen container 50 does not depend upon impact of the bomb with the ground for actuation. The principal difference in the construction shown in Figs. 11, 12 and 13 over that shown in the previous figures being simply in the apparatus intended to fracture the oxygen container 50, the parts described in connection with the previous figures are indicated by the same numerals and parts not shown will be understood to be identical with the construction shown in the previous figures.

In the construction illustrated in Figs. 11, 12 and 13 a lever 170 is pivotally mounted at 172 on a bracket 174 secured to the inner face of the main body portion 20 and extends in preferably diametric relation across the container to a point adjacent the opposite side thereof. Such opposite side is connected by a short rod 176 with the lower end of a pressure contractible element 178 such as the metal bellows shown. The upper end of the metal bellows 178 is connected through a swivel connection 180 with the lower end of the screw element 182 threaded downwardly through a boss 184 on the top wall 22 of the main container. If desired the screw 182 may be provided with a head 186 bearing suitable graduations or indicia thereon indicative of the distance which it is desired to have the bomb fall before fracture of the oxygen container 50, or the pressure built up interiorly of the main container before the oxygen container 50 will be fractured, and a pointer 188 may be provided in association with such indicia. The lever 170 immediately below the flask 50 is preferably provided with an upwardly extending projection 190 terminating in a sharp edge or point normally lying immediately below and closely adjacent to the bottom wall of the flask 50. Where pointed it may be capable of forcing its way up through the springs 60 which may cross on the axial line of the flask 50 and through the screen 62 interposed between such springs and the bottom of the flask. On the other hand the screen 62 may be provided with an opening over the central portion of the flask bottom and a ring such as 192 may be provided centrally of the bottom of the flask for offsetting the springs 60 from the central area thereof and thus to provide a clear opening for the projection 190 to pass into contact with the bottom of the flask.

It will be appreciated that this construction utilizes pressure built up internally of the bomb by the generation of acetylene thereof to effect axial contraction of the element 178 and pivotal movement of the lever 170 as a result thereof to force the projection 190 into the bottom of the flask 50 and cause rupture of the same. The rate of pressure rise in the bomb may be accurately predetermined and the screw 186 may be adjusted to regulate the operation of the element 178 to cause fracture of the oxygen container at a particular desired pressure within the bomb. Inasmuch as the rate of acceleration of the bomb when dropped may be accurately determined and the time required for the pressure to build up to a predetermined extent also accurately determined, the apparatus may be adjusted to effect fracture of the oxygen container at a predetermined distance below the carrying plane. In other words it does, in effect, provide a time controlled mechanism for fracturing the oxygen container.

Where the tube 90 is not positioned to serve as a breaker bar to insure breakage of the flask 50 in event the bar 170 has not already crushed the flask when the bomb strikes the ground, then additional precautions may be taken to insure the breakage of the flask 50. The means shown for this purpose comprises a U-shaped member 193 which extends around the bellows 178 as indicated in Fig. 11 and the free marginal end portions of which slidably surround the pin 176 and the corresponding pin at the opposite end of the bellows, respectively. The member 193 thus limits expansion of the bellows 178 but permits free contraction thereof. It thus provides a rigid anchorage for the free end of the bar 170 against relative downward movement and thus conditions the bar for the same purpose as the tube 90 previously described as far as serving as a breaker bar for the flask 50 upon impact of the bomb with the ground is concerned.

While the same opening 168 may be employed in the construction shown in Figs. 11, 12 and 13 to permit escape of the originally entrapped air and to prevent an excessive pressure from being built up internally of the bomb by the generation of the acetylene before detonation, apparatus of a different character for taking care of this problem is illustrated in the modification shown in Figs. 11, 12 and 13 and as will be appreciated by the following description such apparatus is equally applicable to the construction shown in the preceding figures. In this case the main body portion 20 adjacent its upper end is provided with an integrally threaded boss 192 best shown in Fig. 13. Into this boss is screwed a valve body 194 having a tapered valve plug 196 rotatably mounted therein, the valve plug having an axial passage 198 therein in open communication with the interior of the bomb. It is also provided with a large cross-passage 200 and a small cross-passage 202 both of which are in constant open communication with the passage 198. The passages 200 and 202 are angularly displaced from one another about the axis of the plug 196. The body 194 is provided with a passage 204 with which either passage 200 or 202 may be aligned by suitably turning the plug 196. The valve plug 196 is provided with an axial extension 206 the outer end of which terminates in a plane surface or flag 208 indicated in its raised position by dotted lines and in its horizontal position in full lines.

A coil spring 210 is connected with the flag 208 a short distance from the axis of rotation thereof and with a suitable bracket 212 secured to the outer face of the main body portion 20 below the valve body 194. The spring 210 which is mounted under tension constantly urges the valve plug 196 in a direction to bring the passages 200 and 204 into alignment and in which position the flag 208 is disposed horizontally. The tension of the spring 210 is preferably such that when the bomb is dropped the pressure of the air on the flag 208 due to the downward velocity of the bomb will tend to rotate the plug 196 to a position to bring the passage 200 out of alignment with the passage 204 and to bring the passage 202 into alignment therewith. The force of the spring is desirably such as to overcome this tendency of the air acting on the flag 208 to turn the valve plug 196 until the velocity of the bomb has reached a predetermined value only attained after it has dropped a desired distance from the carrying plane. The operation of the valve mechanism thus described is preferably so arranged that generation of acetylene through inter-action of the water with the calcium carbide will have proceeded some moments and at least for a sufficient length of time to have permitted the generated acetylene to have driven substantially all of the air out of the bomb through the passage 200 before the valve is actuated to align the passage 202 with the passage 204 and thereby further restrict the escape of the acetylene gas from the bomb and permit the desired pressure to be built up therein to effect actuation of the flask fracturing apparatus shown in Fig. 11.

By the above described means ample precautions are provided whereby fracture of the flask 50 and consequent intermingling of the liquid oxygen content thereof with the acetylene being generated in the lower portion of the bomb will not occur until the bomb is at a sufficient distance below the carrying plane to eliminate any possible danger to the plane in event detonation of the bomb prematurely occurs upon fracture of the oxygen container. Premature explosion for the above described reason is extremely unlikely for the reason that in breaking the oxygen container 50 the breaking action will occur through the crushing effect of the projection 190 rather than from concussion. As will be appreciated the form of construction illustrated in Figs. 12 and 13 permits a greater time element for intermixture of the oxygen and acetylene prior to detonation than is possible in the first described construction and may be desirable for that reason.

From the above description it will be appreciated that in accordance with the present invention a method is provided by means of which a mixture of acetylene and oxygen may be provided and ignited for the purpose of utilizing the explosive effects thereof for demolition or other purposes. It will also be appreciated that the method provided is safe for the user in spite of the dangerous characteristics of an admixture of these gases. It will also be appreciated that the apparatus which I have provided for carrying out this method is of somple construction, economical to produce and substantially foolproof in operation.

Having thus described my invention what I claim by Letters Patent is:

1. A bomb comprising, in combination, a substantially closed main container, a shatterable second container within said main container, a mass of water sealed in said second container, a mass of calcium carbide below said second container, a shatterable third container within said main container and having a neck, a mass of liquid oxygen in said third container, means sealing the neck of said third container from the interior of said main container, spring actuated means for fracturing said water container, and intertia operated means for shattering said oxygen container.

2. A bomb including a substantially closed container, means for generating acetylene gas therein, a shatterable second container within the first mentioned container, a mass of liquid oxygen in said second container sealed from the remaining contents of said main container, and pressure operated means for shattering said second container whereby to discharge the contents thereof into contact with said acetylene gas.

3. A bomb including a substantially closed container, means for generating acetylene gas therein, a fragile second container within the first mentioned container, a mass of liquid oxygen in said second container sealed from the remaining contents of said main container, pressure operated means for shattering said second container whereby to discharge the contents thereof into contact with said acetylene gas, and additional means operated in delayed relation with respect to said pressure operated means for igniting the mixture of acetylene and oxygen.

4. A bomb comprising, in combination, a substantially closed main container, a fragile second container within said main container, a mass of water in said second container, a fragile third container within said main container, a mass of liquid oxygen in said third container, resilient means normally maintaining said oxygen container in fixed position in said main container but yieldable under impact of said bomb with the ground to permit downward movement of said oxygen container, a breaker bar positioned in the path of downward movement of said oxygen container upon contact of said bomb with the ground for shattering said oxygen container, a mass of calcium carbide arranged below said second container, and means for shattering said second prior to contact of said bomb with the ground.

5. A bomb comprising, in combination, a main container, a shatterable second container within said main container, a mass of water sealed in said second container, a shatterable third container within said main container, means for shattering said third container upon impact of said bomb with the ground, means operable at will for shattering said second container, and means for introducing a mass of calcium carbide into said main container through a wall thereof.

6. In a bomb, in combination, a container, means for generating acetylene gas therein, a vent valve associated with said container and including a movable element providing when in one of its positions for a maximum flow of gas from said container therethrough and when in another of its positions for a lesser flow of said gas therethrough, means constantly urging said movable element towards the first mentioned of said positions, and means operated by the pressure of air thereagainst for overcoming said constantly urging means and moving said movable element to the second mentioned position thereof.

ROBERT S. PALMER.